US006267219B1

(12) United States Patent
Spannhake et al.

(10) Patent No.: US 6,267,219 B1

(45) Date of Patent: Jul. 31, 2001

(54) ELECTRONIC SAFETY SYSTEM FOR ESCALATORS

(75) Inventors: Stefan Spannhake; Reinhard Henkel; Jürgen Gewinner, all of Berlin (DE)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/636,030

(22) Filed: Aug. 11, 2000

(51) Int. Cl.[7] .................................................... B65G 15/00

(52) U.S. Cl. ............................................ 198/323; 198/322

(58) Field of Search ...................................... 198/322, 323

(56) References Cited

U.S. PATENT DOCUMENTS 5,697,485 12/1997 Abraham et al. .................... 198/322

5,785,165 7/1998 Stahlhit et al. ...................... 198/322

5,886,497 3/1999 Zaharia ................................ 318/779

*Primary Examiner*—James R. Bidwell

(74) *Attorney, Agent, or Firm*—Carlson, Gaskey & Olds, P.C.

(57) ABSTRACT

An escalator safety system monitors a variety of sensors, contacts, and switches over an electronic safety bus. A plurality of bus nodes are distributed throughout the escalator system and are in constant communication with the bus master over the safety bus. The bus nodes interface with sensors, switches, contacts, detectors, components, and other safety equipment of the escalator system at each location and provide status information back to the bus master. The bus master preferably includes a microprocessor which upon sensing an unsafe condition, sends control signals to an escalator control and a drive and brake system to arrest the escalator in a safe manner.

15 Claims, 1 Drawing Sheet

ELECTRONIC SAFETY SYSTEM FOR ESCALATORS

BACKGROUND OF THE INVENTION

This invention relates to a passenger conveyor system, and more particularly to a safety system including a communication bus that connects safety related components.

A typical passenger conveyor, such as an escalator or moving walk, includes a truss, a plurality of sequentially connected treadplates traveling through a closed loop path within the truss, and a machine for driving the treadplates.

Escalators and moving walks include devices such as sensors for monitoring speed, sensors for detecting missing treadplates, devices for monitoring wear; actuators for utilizing special purpose devices and output devices, such as traffic lights. Each of these devices includes a combination of interface devices, i.e., sensors, switches or actuators, that are connected to a central control. To assure the continued operation of the sensors typical passenger conveyers include a safety system that monitors and responds to each sensor.

Conventional escalator safety systems are implemented using a Safety Chain which is a serial circuit of the switches and contacts. The Safety Chain operates relays (or contactors) that handle the power to the escalator motor. An operation of any contact within the chain will disconnect the motor or drive from the main power supply. The serial connections of the contacts and the bridging for inspection leads to a long chain which requires higher voltages to minimize the effects of voltage losses along the chain.

Because the Safety Chain is wired in serial, a failure cannot be specifically identified. During maintenance and inspection, it is sometimes necessary to include bridges in the Safety Chain by hand for testing and error searching. Manual installation and removal of the bridges is time consuming and labor intensive. Further, the serial connection renders remote checking difficult.

Therefore it has been determined that a need exists for an improved safety system which lowers part count and manufacturing costs, all while improving operability.

SUMMARY OF THE INVENTION

An escalator system designed according to this invention improves inspection and diagnostic work, promotes safe escalator operation, and enables safe degradation when an unsafe condition is detected. The safety system includes a communications bus which facilitates the exchange of control and data signals between a microprocessor based safety controller or “bus master”. Various other components including bus nodes designed to interface with sensors, contacts, and switches along with detectors, components, and other safety equipment ensure the safe operation of the escalator system.

The software controlled bus master operates a communications bus which has bus nodes throughout the entire escalator system. The bus nodes are periodically polled to ascertain the status of the sensors, contacts, and switches connected to the bus nodes. The microprocessor may operate in one of several different modes such as maintenance, inspection, normal operations, degraded operations, and emergency operations. When appropriate, the bus master generates output signals to the escalator control system and the escalator drive and brake system.

If an unsafe condition occurs, the bus master generates the appropriate outputs to be conveyed to the escalator control and drive systems. The safety controller may activate devices to arrest the escalator’s motion. The bus master and associated components provide an electronic safety system which can be centrally managed, greatly improves installation time, quality, manufacturing costs, and operational characteristics.

The various features and advantages of this invention will become apparent to those skilled in the art from the following detailed description of the currently preferred embodiment. The drawings that accompany the detailed description can be briefly described as follows.

BRIEF DESCRIPTION OF THE DRAWING

The FIGURE schematically illustrates an electronic safety system for an escalator system designed according to this invention.

DETAILED DESCRIPTION OF THE PREFERRED EMBODIMENT

Figure 1:
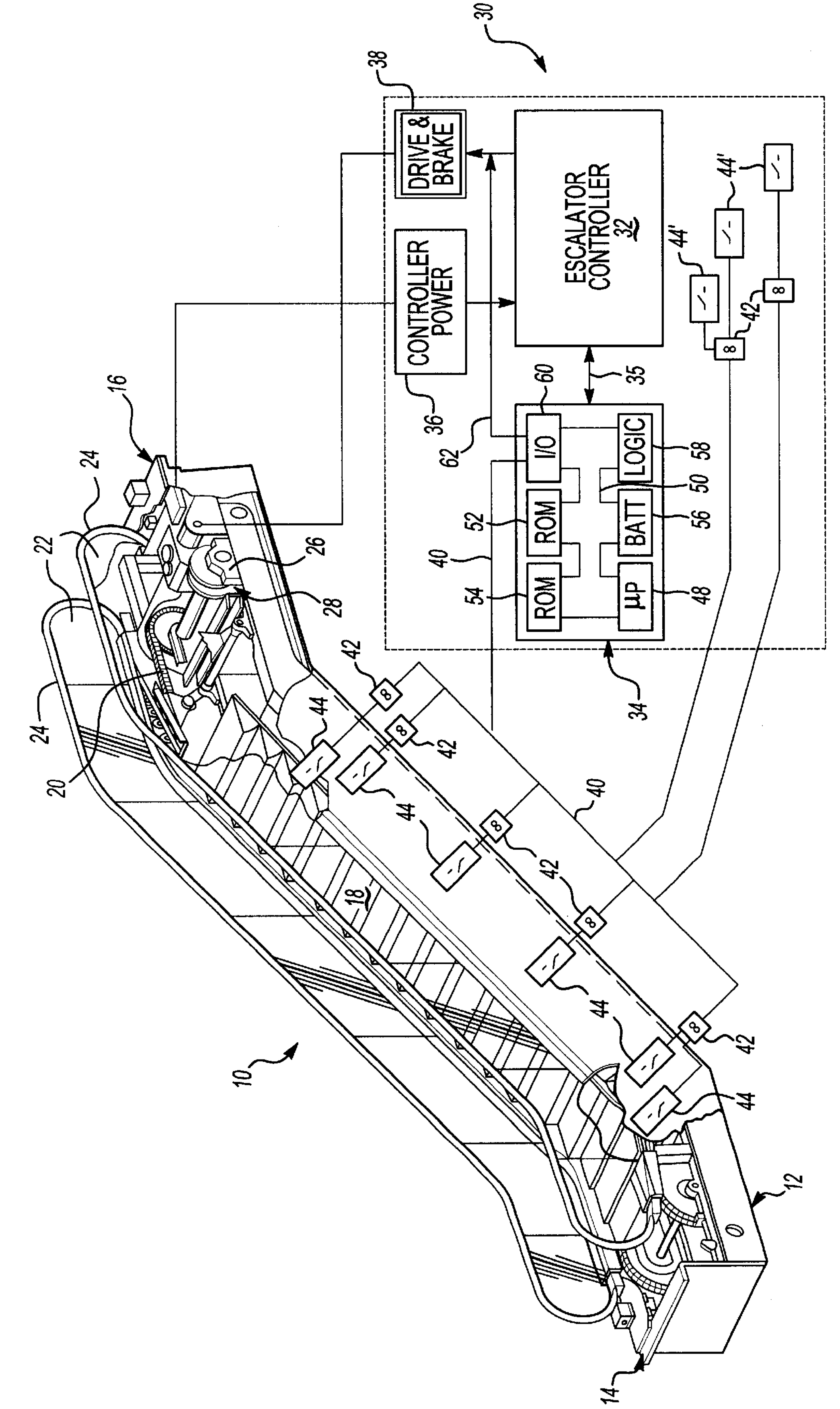

The FIGURE illustrates an escalator system 10. It should become apparent in the ensuing description that the invention is applicable to other passenger conveyors, such as moving walks. The escalator system 10 generally includes a truss 12 extending between a lower landing 14 and an upper landing 16. A plurality of sequentially connected treadplates 18 are connected to a step chain 20 and travel through a closed loop path within the truss 12. A pair of balustrades 22 have handrails 24. A machine 26 drive the treadplates 18 and handrails 24. The machine 26 is typically located in a machine space 28 under the upper landing 16.

An electronic safety system 30 includes an escalator controller 32 that communicates with an electronic safety controller such as a bus master 34, an escalator power system 36, and a drive and brake system 38, which operates the machine 26.

The bus master 34 communicates over a bus 40 with a plurality of bus nodes 42.

The bus master 34 is preferably implemented using a communications protocol known as a Controller Area Network (CAN) bus.

Each bus node 42 interfaces with at least one sensor device 44. The sensor devices 44, such as sensors, switches, contacts or other input or output devices are distributed throughout the escalator system 10. The sensor devices 44 preferably include such sensors as a speed sensor for the treadplates 18, a sensor to detect missing treadplates 18, a limit switch to detect excessive wear of the step chain 20 and treadplates 18, and a sensor to monitor the speed of the handrails 24. Also among the sensor devices 44 are, for example, a switch in each landing 14, 16, to detect the presence of a passenger and to trigger a change in speed of the treadplates 18, and a switch in each landing 14, 16, to actuate the operation of a wheelchair platform embedded into the treadplates 18. Further, other sensor devices 44 such as sensors 44', which monitor the status of the electronic safety system 30, also preferably communicate over the bus 40. In addition to the safety devices that are connected to the safety bus it is possible to connect non-safety components such as a traffic light or an operational panel on the bus to save installation effort.

The bus master 34 continuously processes the data from the bus nodes 42 which communicate with the sensor devices 44. Under predetermined conditions the bus master 34 provides a signal to the escalator controller 32 through an input/output connection 35. The escalator controller 32 sends an appropriate control signal to the escalator drive and brake system 38 to carry out the appropriate measure, e.g., switch off the escalator drive system, activate the brake and generate a detailed diagnostic.

The bus nodes 42 are located along the escalator system 10 to communicate with the variety of sensor devices 44 that send data to the bus node 42. The data gathering sensor devices 44 may be wired to a bus node 42 in parallel or in series or in a combination of the two depending on the quantity of sensors, contacts or switches being monitored by a particular bus node 42. However it is desirable to have as many sensors, contacts or switches wired in parallel with each other so that when the bus node 42 receives an input from one of these devices, the bus node 42 will know which particular device is sending information to it. This architecture allows the software program executing on the bus master 34 to pinpoint the source and condition causing the data signal. This is a significant advantage compared to a serial wiring circuit where the software program can only identify the data signal at a circuit level.

Power is delivered to the sensor devices 44 by the bus nodes 42. Due to the short distances between the bus nodes 42 and the sensor devices 44, a lower voltage can be used, in this case 24Vdc.

Importantly, the sensor devices 44 can be automatically tested by the software program. This feature obviates the need for manual checks and reduces inspection times. It also allows a service routine to be expanded in time and focus on other critical maintenance areas. The bus master 34 determines whether an unsafe condition exists based upon known logic.

It will be appreciated by those skilled in the art that the bus 40 design is very flexible and that additional bus nodes 32 may be added or dropped as needed with the appropriate changes made in software to process the new data. Also some nodes 32 may have spare input/output capacity so that they may interface with additional sensors 44. The modularity of the bus 40 allows these types of modifications to be made in an improved manner over the prior art.

The bus master 34 preferably includes a microprocessor 48 that internally communicates over a microprocessor system bus 50 with a read-only memory (ROM) 52, a random access memory (RAM) 54, a power back up unit (BATT) 56, a logic unit 58 and an input/output communications port (I/O) 60. Each of these can be realized with conventional components, custom integrated circuits, custom software or a combination of the three. Given this description, those skilled in the art will be able to choose from among the various options. It should be noted that although in this embodiment a ROM 52 is used for a non-volatile memory, other types of non-volatile memory such as EPROM may be used. The microprocessor 48 executes a software program stored in the ROM 52. The ROM 52 also contains tables of data for the particular escalator installation.

The volatile memory may, for example only, be designed as Flash ROM, so that software updates may be downloaded from a maintenance computer PC (not shown). This method may be used to effect code or data changes or both. Although the volatile memory storage device in the disclosed embodiment is the ROM 52, other storage devices may include a hard drive, CD ROM, DVD, RAM, ROM or other optically readable storage, magnetic storage or integrated circuit.

The bus master 34 communicates with the bus nodes 42 over the bus 40 through I/O port 60. The bus 40 may be a single bus (bus A) or a dual redundant bus (bus A and bus B, not shown). Thus, the bus master 34 can communicate with any of the bus nodes 42 over either bus A or bus B (not shown) as well known to those skilled in the art. Although, a single bus and single microprocessor are illustrated in the disclosed embodiment, other configurations will benefit from the present invention as described in more detail in co-pending U.S. Pat. application Ser. No. Filed entitled ELECTRONIC SAFETY SYSTEM FOR ELEVATORS which is incorporated by reference in its entirety into this description.

Communications between the bus master 34 and the bus nodes 42 are preferably scheduled by software to communicate with every bus node 42 periodically regardless of whether data is being provided by the bus node 42. Periodic communications allows the software running on the bus master 34 to positively reaffirm that the communications through the bus 40 to the bus nodes 42, are operational. These periodic messages include status information from hardware checks performed at each bus node 42.

In one embodiment of a normal operational mode, each bus node 42 is polled twice on the same data set, and the data sets are compared by the software program to make sure they are identical. If the data sets do not match, the software program in ROM 52 polls the bus node 42 again to determine its reliability. The software program may determine the mismatched data was a one time anomaly or it may determine that there is a communications failure which needs repair. The software program in ROM 52 may communicate with the escalator controller 32 to shut down the escalator system 10 if it determines that communications with the bus nodes 42 have become unreliable. In another embodiment, the bus master 34 directly communicates with the drive and brake system 38 through a redundant communication relay 62. The bus master 34 can thereby immediately shut down the escalator system 10 should the escalator controller 32 fail.

The software program preferably runs in various modes such as inspection and maintenance, normal operations and emergency operations. It performs various routines or calls such as polling the bus nodes 42 for communication status and data. The program also outputs control signals and data to the escalator controller 32 and drive and brake system 38.

Bus polling is implemented by the cyclic interaction of the master, in this case the bus master 34, with its slaves, in this case the bus nodes 42. Various schemes may be implemented to detect failures of the bus 40. One example is a timeout, where the bus master 34 presumes that the bus node 42 has failed if it does not respond to a communication from the bus master 34 within a certain predetermined amount of time. Another method is that each message transmitted on the bus 40 is tagged with an ID number in an increasing order. If a message ID is received by the bus master 34 out of order, it determines that a message has been lost or has failed to have been transmitted. Under such conditions, the bus master 34 determines that a failure has occurred.

An echo technique may also be used wherein the bus master 34 expects an acknowledgement for each and every communications message put on the bus from the respective bus node 42 to which it is addressed. If the bus master 34 does not receive an acknowledgement from the targeted bus node 42, the bus master 34 assumes the node 42 has failed.

In a bit monitoring scheme, each bus node 42 monitors the bus 40 to see if the sent bit is present on the bus 40. Once the bus node 42 realizes that the transmitted message is not being communicated to the bus master 34, then the bus node 42 can report a failure to the bus master 34. A bit stuffing technique may also be used to verify the integrity of messages wherein, based on a pre-determined algorithm, a transmitter inserts stuffed bits of opposite logic after a certain number of bits with the same logic level have been transmitted.

Another technique is a CRC Checksum wherein a checksum is inserted in each message to verify message integrity. The message may also be formatted so that each message must fit into a pre-determined format of bit length and/or fields. An acknowledge check may also be implemented wherein at least one receiver has to acknowledge the reception of any transmitted message. Many of these communication techniques are implemented in the CAN bus standard, however the additional techniques described herein above are preferably implemented to increase communications efficiency/and reliability.

In an inspection mode the software can temporarily install a "software bridge" in the safety chain so that various sensors, contacts or switches can be isolated for testing. Thus hardware wiring is no longer necessary to bridge a sensor, contact or switch. An important improvement over the prior art is that the 'software bridges' can be removed automatically by the program either using a time function or when the software program exits the inspection mode and returns to the normal operations mode. In either case, an operator no longer is needed to insert and subsequently remove all of the hardware wiring or mechanical bridges for inspection or maintenance work.

Given this description, those skilled in the art will be able to develop the necessary software code to achieve the results provided by this invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A passenger conveyer safety system comprising:

a control unit; and a safety controller in communication with said control unit, said safety controller in periodic communication over a bus with a plurality of bus nodes, said periodic communication separated by a relatively short interval, each of said bus nodes receiving data from at least one safety sensor, said safety controller operable to send a signal to said control unit in response to said data received from said plurality of bus nodes.

2. A passenger conveyer safety system as recited in claim 1, wherein said safety controller comprises a microprocessor executing a safety program having multiple modes of operation.

3. A passenger conveyer safety system as recited in claim 2, wherein said safety program includes an inspection and maintenance mode which will one of fail, isolate, and bridge said at least one sensor, to ascertain a response from said safety system.

4. A passenger conveyer safety system as recited in claim 1, wherein said at least one sensor includes a plurality of sensors communicating with a common bus node.

5. A passenger conveyer safety system as recited in claim 4, wherein said plurality of sensors are connected to said common bus node in serial.

6. A passenger conveyer safety system as recited in claim 4, wherein said plurality of sensors are connected to said common bus node in parallel.

7. A passenger conveyer safety system as recited in claim 2, wherein said safety program includes a muting of a function in response to a selected mode of operation ion.

8. A passenger conveyer safety system as recited in claim 1, wherein said safety controller includes:

a microprocessor for executing a safety program;

a read only memory for storing said safety program and predetermined data;

a random access memory;

a battery backup unit; and at least one input/output port for communications with said bus, and said escalator control.

9. A passenger conveyer safety system as recited in claim 1, wherein said safety controller includes:

a redundant communication relay for direct communications with an escalator drive and brake unit.

10. A passenger conveyer safety system as recited in claim 1, wherein said at least one sensor includes a non-safety related component.

11. A passenger conveyer safety system as recited in claim 1, wherein said safety system is in independent communication with a plurality of independent escalator drive and brake units.

12. A passenger conveyer safety system comprising:

a control unit;

a drive and brake unit in communication with said control unit; and a safety controller in communication with said drive and brake unit and said control unit, said safety controller in periodic communication over a bus with a plurality of bus nodes, said periodic communication separated by a relatively short interval, each of said bus nodes receiving data from at least two safety sensors connected in parallel, said safety controller including a microprocessor which determines if an unsafe condition exists, and if so, said microprocessor sends an arrest signal to said drive and brake unit in response to said data received from said plurality of bus nodes, and further sends a status signal to said escalator control.

13. A passenger conveyer safety system as recited in claim 1, wherein said safety controller periodically communicates over said bus with said plurality of bus nodes regardless of whether data is being provided by the bus node.

14. A passenger conveyer safety system as recited in claim 1, wherein said safety controller communicates over said bus with said plurality of bus nodes, each bus node being polled on a first and a second data set, said data sets being compared by said safety controller.

15. A passenger conveyer safety system as recited in claim 1, wherein each of said bus nodes responds to said safety controller within a predetermined time period.

* * * * *